United States Patent
Simone (10) Patent No.: US 12,234,853 B1
(45) Date of Patent: Feb. 25, 2025

(54) NUT FEEDER AND INSTALLATION MACHINE

(71) Applicant: Doben Limited, Windsor (CA)

(72) Inventor: David M. Simone, Amherstburg (CA)

(73) Assignee: DOBEN LIMITED, Windsor (CA)

( * ) Notice: Subject to any disclaimer, the term of this patent is extended or adjusted under 35 U.S.C. 154(b) by 0 days.

(21) Appl. No.: 18/778,410

(22) Filed: Jul. 19, 2024

(51) Int. Cl.
  *F16B 37/06* (2006.01)
  *B23P 19/00* (2006.01)

(52) U.S. Cl.
  CPC .......... *F16B 37/062* (2013.01); *B23P 19/005* (2013.01); *B23P 19/006* (2013.01)

(58) Field of Classification Search
  CPC ...... F16B 37/062; B23P 19/005; B23P 19/006
  See application file for complete search history.

(56) References Cited

U.S. PATENT DOCUMENTS

| | | | |
|---|---|---|---|
| 2,652,942 A | 9/1953 | Muchy | |
| 2,905,803 A | 9/1959 | Brady, Jr. | |
| 4,610,072 A | 9/1986 | Muller | |
| 4,789,768 A | 12/1988 | Tobita et al. | |
| 6,163,004 A * | 12/2000 | Aoyama | B23K 11/14 219/148 |
| 10,471,549 B2 | 11/2019 | Koscielski et al. | |
| 2016/0368106 A1 | 12/2016 | Koscielski et al. | |
| 2017/0239747 A1 | 8/2017 | Koscielski et al. | |

FOREIGN PATENT DOCUMENTS

| | | |
|---|---|---|
| EP | 1606076 B1 | 2/2010 |
| GB | 1371328 A | 10/1974 |
| WO | 2016000077 A1 | 1/2016 |
| WO | 2024103147 A1 | 5/2024 |

OTHER PUBLICATIONS

International Search Report and Written Opinion for International Application No. PCT/CA2023/051312 mailed Jan. 9, 2024.

* cited by examiner

*Primary Examiner* — Jason L Vaughan
*Assistant Examiner* — Amanda Kreiling
(74) *Attorney, Agent, or Firm* — Carlson, Gaskey & Olds, P.C.

(57) ABSTRACT

A method of feeding a fastener in a machine for installation onto a workpiece, the method includes a) feeding a fastener into a block having channel with a stop against which the fastener abuts in a fastener loading position, the channel is at least partially covered by a flexible retainer plate that captures the fastener within the channel, b) moving the block relative to a pin to engage the fastener with the pin, the pin has a longitudinal pin axis, c) forcing the fastener into the retainer plate in a direction of the longitudinal pin axis to deflect the retainer plate away from the channel and disengage the fastener from the stop, d) retracting the block relative to the pin to support the fastener on the pin clear of the block, and e) securing the fastener to the workpiece.

15 Claims, 9 Drawing Sheets

NUT FEEDER AND INSTALLATION MACHINE

TECHNICAL FIELD

This disclosure relates to a securing machine (e.g., welding station) for securing a fastener (e.g., nut) to a workpiece, such as sheet metal. More particularly, this disclosure relates to a head assembly for welding the fastener while sensing fastener position and a feeder for loading the fastener onto the head assembly.

BACKGROUND

Securing machines, such as welding stations and clinching presses, are used to secure fasteners to objects such as metallic body panels for vehicles. A fastener, such as a nut, is loaded onto a head assembly. The head assembly moves to press the fastener against the panel and ultimately secure it by welding, clinching or another process.

Fastener loading onto the head assembly of the machine is typically an automated process to minimize the fastener loading time, improve process reliability, and reduce pinch point hazards. Occasionally, the fastener is not properly loaded onto the head assembly or the fastener may not be loaded onto the head assembly at all. When an operator or robot is manipulating the panel into position for fastener installation, the fault condition may be identified before or after the machine has performed the installation cycle.

Sensors have been used in an effort to determine the presence and orientation of the fastener in the machine. Additional switches or sensors have been used to detect the machine operation indicative of a fastener fault. Typically, a linear variable displacement transducer (LVDT) has been connected to an exterior of a ram that carries the head assembly to measure the movement of the head assembly. If no nut is present, then the head assembly will move a greater amount than if a fastener is present and in the proper orientation. If the fastener is not in the proper orientation, then the head assembly will move slightly less than if the fastener is in the proper orientation. In this manner, fastener presence and orientation has been detected.

But, these fastener checks are performed and indicate a fault condition has already occurred. So, it is still better to prevent fastener loading errors using a more robust fastener feeding mechanism and method.

SUMMARY OF THE INVENTION

In one exemplary embodiment, a method of feeding a fastener in a machine for installation onto a workpiece, the method includes a) feeding a fastener into a block having channel with a stop against which the fastener abuts in a fastener loading position, the channel is at least partially covered by a flexible retainer plate that captures the fastener within the channel, b) moving the block relative to a pin to engage the fastener with the pin, the pin has a longitudinal pin axis, c) forcing the fastener into the retainer plate in a direction of the longitudinal pin axis to deflect the retainer plate away from the channel and disengage the fastener from the stop, d) retracting the block relative to the pin to support the fastener on the pin clear of the block, and e) securing the fastener to the workpiece.

In a further embodiment of any of the above, the channel includes a first slot that has a first width and extends to the stop, and the channel includes a second slot that overlaps the first slot at the fastener loading position. The second slot has a second width that extends to an opening in the end of the block. The fastener has a first diameter portion and a second diameter portion that is smaller than the first diameter portion. Step a) is performed by sliding the fastener along the channel to the fastener loading position in which the first diameter portion is arranged in the first slot and the second diameter portion is arranged in the second slot in abutment with the stop.

In a further embodiment of any of the above, step a) includes blowing a fastener along a track with multiple fasteners and into the channel.

In a further embodiment of any of the above, the fastener is a first fastener that is arranged adjacent a second fastener in a track. Step a) includes retracting a first escapement to release the first fastener down the track to the channel while retaining the second fastener in the track with a retractable second escapement.

In a further embodiment of any of the above, step c) includes pushing the first diameter portion out of the first slot and past the stop.

In a further embodiment of any of the above, the retainer plate is supported relative to the block at one end, and the retainer plate includes a notch at another end opposite the one end, and step b) includes supporting the fastener with the pin. The pin extends through the notch, and step d) includes the pin exiting the block through the opening.

In a further embodiment of any of the above, step d) is performed by moving the block relative to the pin in a direction perpendicular to the longitudinal pin axis to strip the fastener from the block.

In a further embodiment of any of the above, step b) is performed by advancing the pin from a head and into the channel.

In a further embodiment of any of the above, step b) is performed by pivoting the block toward a head that supports the pin.

In a further embodiment of any of the above, the method includes a step of advancing the block toward the pin prior to performing step b).

In a further embodiment of any of the above, step e) includes supporting the fastener on a head, and performing one of a welding operation and a clinching operation on the fastener and the workpiece.

In another exemplary embodiment, a machine for securing a fastener to a workpiece includes a fastener feeder having a block with a channel that provides a stop, the channel configured such that the fastener abuts the stop in a fastener loading position, a flexible retainer plate at least partially covers the channel and is configured to capture the fastener within the channel, a fastener joiner with a head having a pin with a pin axis configured to engage the fastener, the fastener feeder and pin are configured to cooperate to forcing the fastener into the retainer plate in a direction of the longitudinal pin axis to deflect the retainer plate away from the channel and disengage the fastener from the stop, and retracting the block relative to the pin supports the fastener on the pin clear of the block.

In a further embodiment of any of the above, the channel includes a first slot that has a first width and extends to the stop, and the channel includes a second slot that overlaps the first slot at the fastener loading position. The second slot has a second width that extends to an opening in the end of the block. The fastener has a first diameter portion and a second diameter portion smaller than the first diameter portion. Step a) is performed by sliding the fastener along the channel to the fastener loading position in which the first diameter portion is arranged in the first slot and the second diameter portion is arranged in the second slot in abutment with the stop.

In a further embodiment of any of the above, an assembly cell includes the machine. The assembly cell includes a multi-axis robot that is configured to transfer the workpiece to and from the machine for a fastener securing operation.

In a further embodiment of any of the above, the assembly cell includes a conveyor that is configured to feed the workpiece to the multi-axis robot.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

The disclosed system provides low-cost, reliable automation to secure fasteners (e.g., a nuts, studs, rivets, self-piercing fasteners, mechanical fasteners or other fasteners) to sheet metal stampings, plastics or other materials at high speeds. Although the disclosed system is discussed primarily in terms of a welding system and method, it should be understood that other types of securing systems are contemplated.

Figure 1:
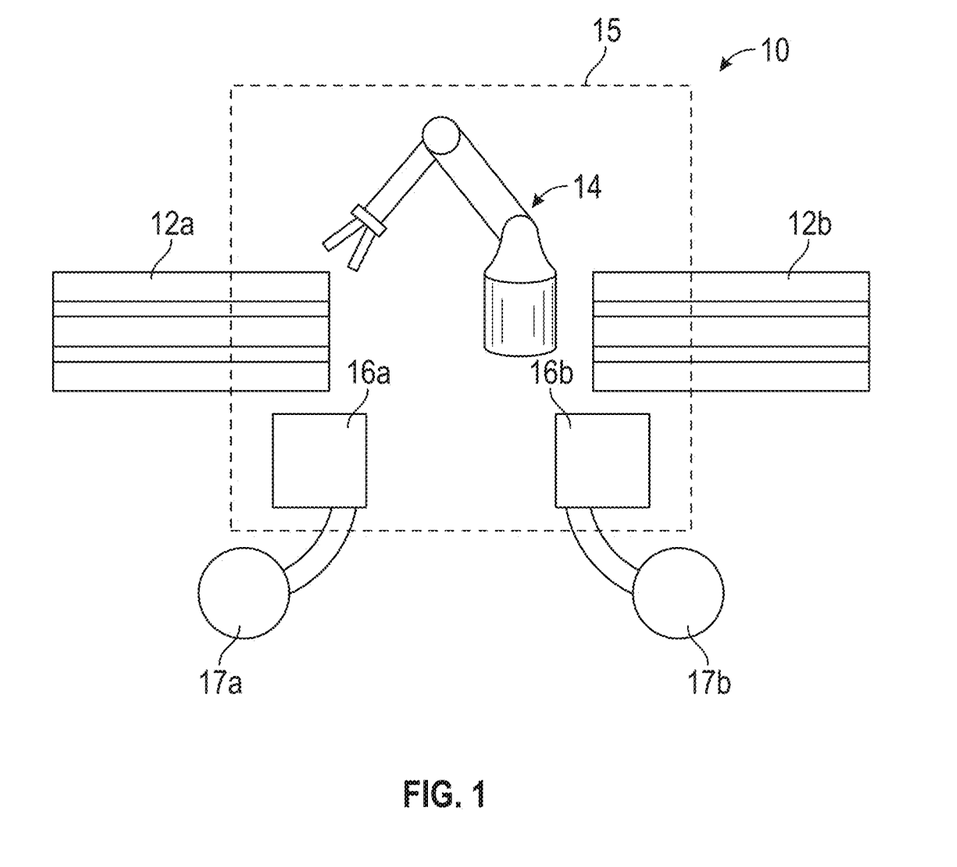
FIG. 1 is a schematic view of a cell with at least one welding station according to the disclosed embodiments.

A fastener securing system 10 is schematically illustrated in FIG. 1. First and second conveyors 12a, 12b feed different parts, such as stampings, into a robot 14 within a cell 15. The high-speed multi-axis robot 14 transfers the parts from the conveyors 12a, 12b to machines 16a, 16b (generally, machine 16). One machine 16a secures a fastener supplied by a vibratory feeder bowl 17a, and the other machine 16b secures a fastener supplied by a vibratory feeder bowl 17b (generally, vibratory feeder bowl 17). The cell arrangement shown in FIG. 1 is exemplary only and may be configured differently than illustrated, for example, fewer or more operations, which may include different operations other than welding.

Figure 2:
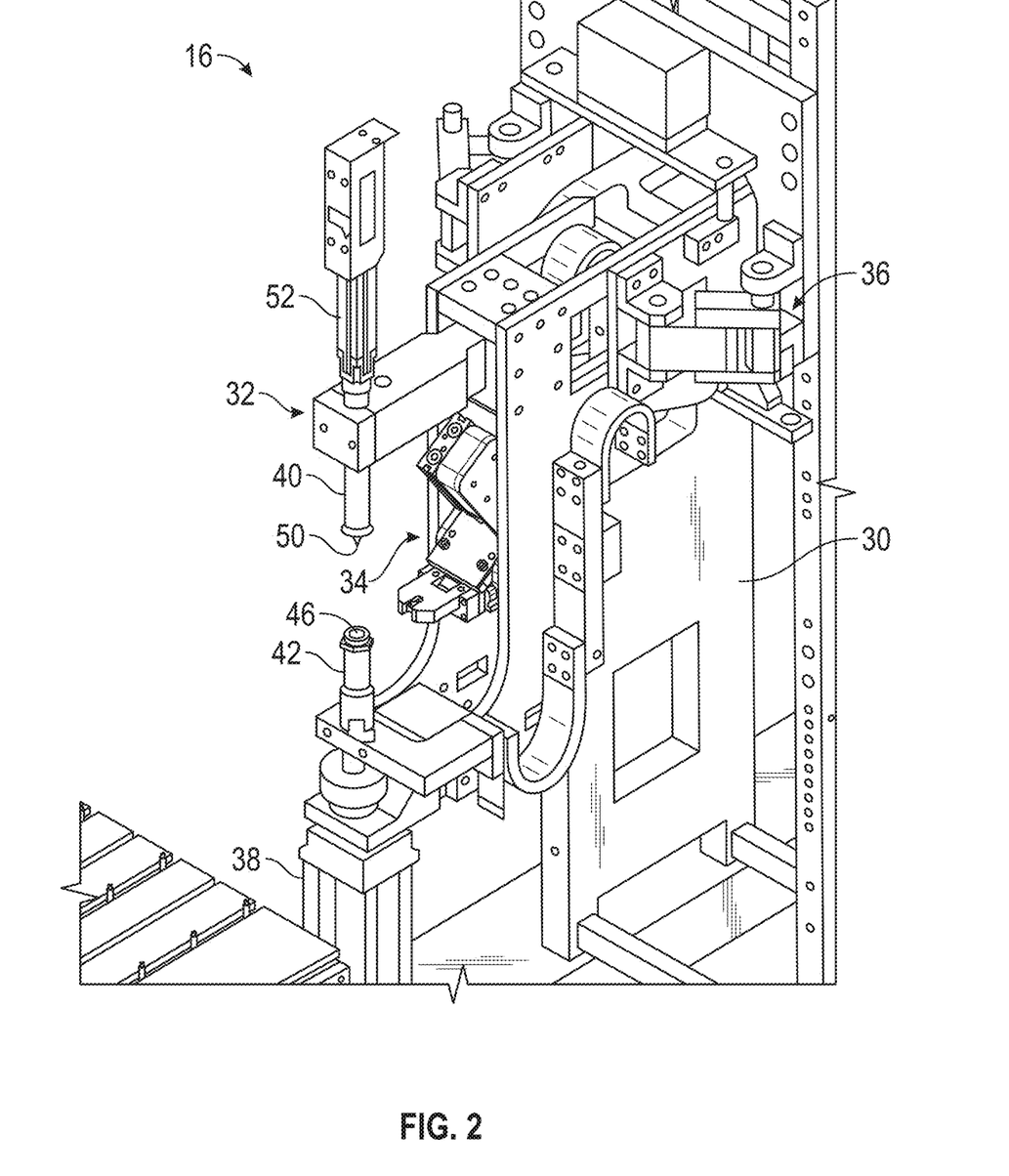
FIG. 2 illustrates an example machine used for welding.

An example machine 16 used for welding is shown in FIG. 2. The machine 16 includes a frame 30 supporting a fastener joiner, e.g., a resistance welding gun 32, and a feeder 34 for delivering a fastener F (e.g., FIG. 5) to be welded to a workpiece. The frame 30 maintains the alignment and orientation of the components and includes provisions for leveling to ensure the desired function. The resistance welding gun 32 is supported relative to the frame 30 by an optional floating mechanism 36 the permits movement of the welding gun 32 relative to the workpiece during the securing operation for improved alignment.

The frame 30 supports a resistance welding transformer to produce the required welding current, and a welding actuator 38 for achieving the required coordinated motion of one electrode 40 (fixed) relative to another electrode 42 (movable) and the necessary electrode force for welding. The resistance welding transformer can be of any type, such as alternating current or inverter.

The resistance welding gun 32 is oriented to exploit gravity to maintain engagement with the fastener F delivered by a feeder 34 as it is moved to the welding position. The feeder 34 dispenses one fastener F to be welded to the workpiece at a time onto the movable electrode 42. The feeder 34 shown is for feeding projection weld nuts. The design of the feeder 34 will be based on the requirements of the fastener F to be welded and may for example be a stud, pin, or bracket; or other process such as feeding of a rivet, screw, clinch nut, mechanical clip, or other mechanical fastener. Thus, the machine 16 can employ a process other than resistance welding (by using another type of gun, for example) or a process other than mechanical fastening such riveting, self-piercing fastener, bolting, or the like.

The machine frame 30 is rigid enough to ensure consistency of the resistance welding gun 32 position when the mass of the gun is shifting and when it is subjected to external forces. When a welding cycle is requested, a valve 138 supplies pressurized fluid from a source 22 (see, FIG. 4.) to extend the welding actuator 38 to a position that is aligned with the feeder 34 when it advances to deliver a component to be welded. A sensor 238 may monitor movement of the moveable electrode 42. When the feeder 34 retracts to its home or feeder retracted position, the welding actuator 38 extends fully to close the electrodes 40, 42 and press the fastener F to be welded against the workpiece positioned by the high-speed robot 14. During the welding sequence, welding current delivered by the resistance welding transformer creates the heat for welding. At the completion of the weld, the welding actuator 38 is retracted to return the moveable welding electrode 42 to its home or electrode retracted position.

Figure 8:
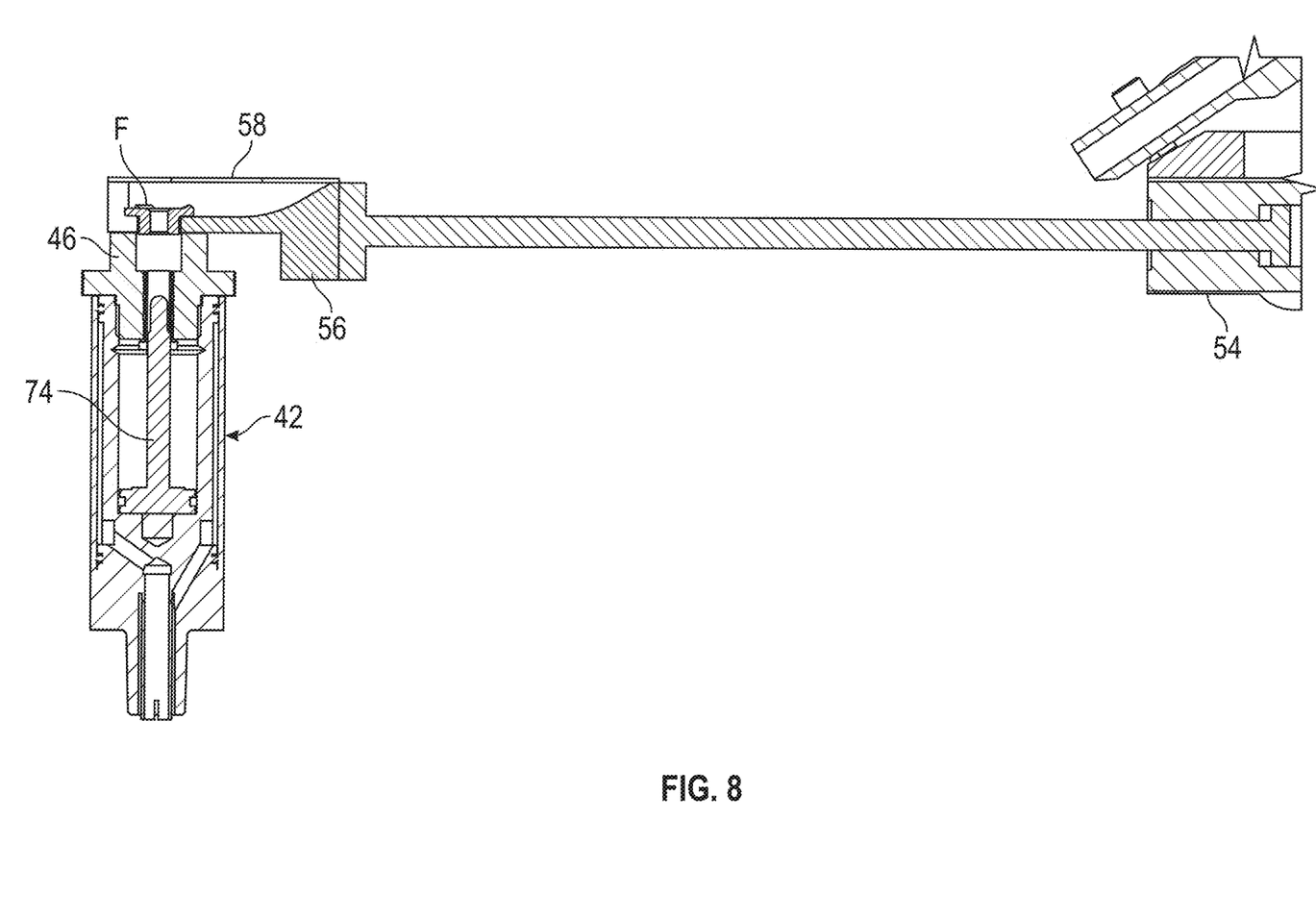
FIG. 8 is a cross-sectional view of the feeder in an extended position with the nut arranged over a head.

Referring to FIGS. 2 and 8, the moveable electrode 42 includes a head 46 connected to the output shaft of the welding actuator 38 and that contains a fastener rough locating pin 74 ("stripper pin"). A stationary electrode 40 containing a fastener locating pin 50 opposite the moveable electrode 42. The fastener locating pin 50 is actuated by a locating pin cylinder and its position is sensed by a locating pin position sensor 52.

Figure 4:
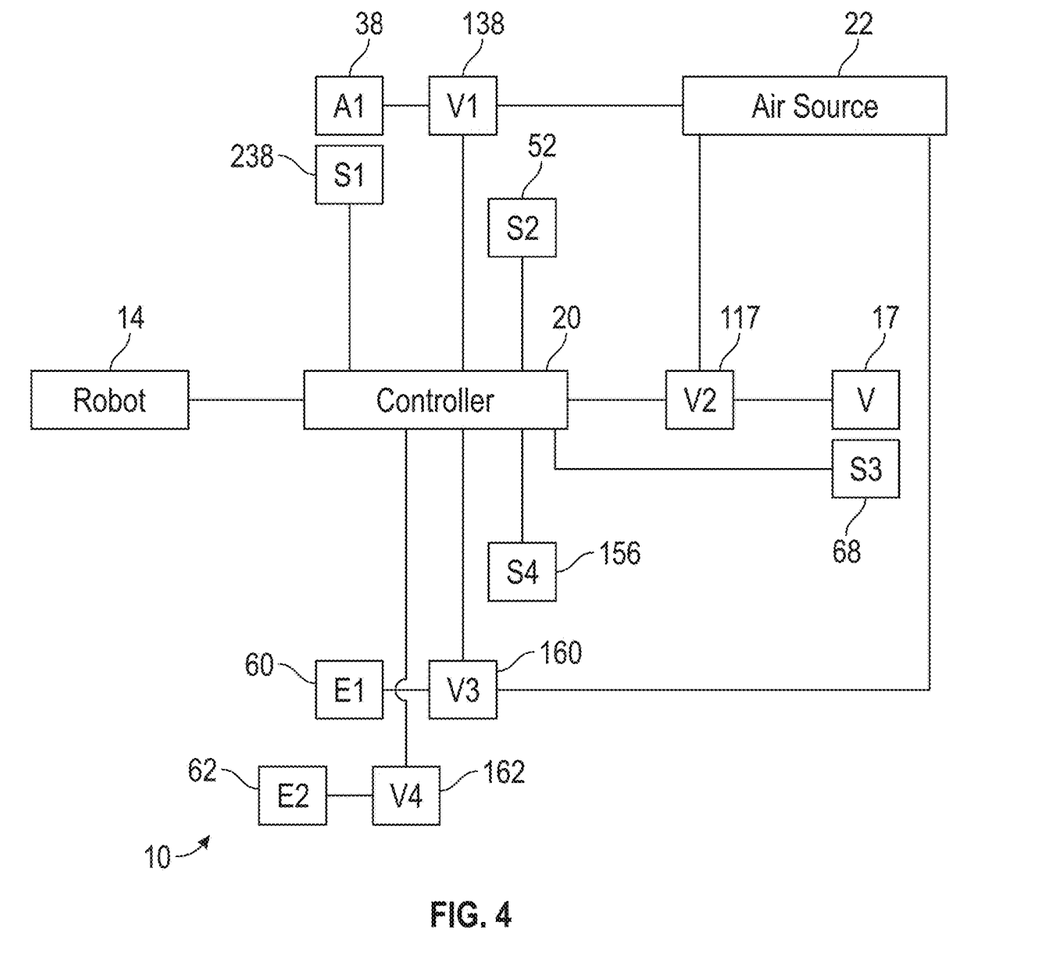
FIG. 4 is a controls schematic of the cell shown in FIG. 1.

Referring to FIG. 4, a control system 20 is interconnected to various elements of the securing system 10 to provide functional control and coordination of the motions of the elements to minimize the operating cycle time. A fastener securing monitor (not shown) is connected to control system 20 in communication with various disclosed sensors (see, e.g., FIG. 4). The sensors track movements of components on the machine 16, which are associated with movement of the fastener throughout the securing operation (e.g., welding or clinching). The control system 20 maintains data for each assembly needed to manage the position and number of fasteners in each assembly, instructions for when the robot can release the assembly, error recovery protocols, weld signatures, and other information for automating the welding of the assembly. A monitor programming interface is connected to the control system 20, and its data analyzed using, for example, statistical analysis software. Despite these numerous sensors and monitoring, accurate, reliable, repeatable loading of the fastener is needed to reduce machine downtime and increase efficiency.

Figure 5:
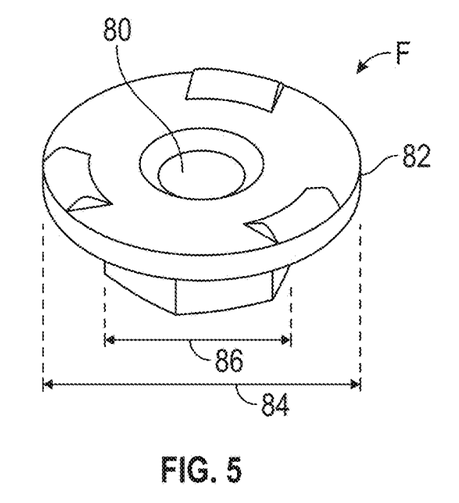
FIG. 5 is a perspective view of a projection weld nut.

The feeder 34 has the task of receiving fasteners F from the vibratory feeder bowl 17 and accurately delivering those fasteners F, one-by-one, to the head 46. Referring to FIG. 5, the fastener F has a first diameter portion 84, which is provided by a flange 82 in the example. A hole 80, which may be threaded, extends through the fastener F in the example. A second diameter portion 86 is smaller than the first diameter portion 84. Other fastener configurations may be used. The feeder 34 positions the fastener to be loaded onto the pin 74 of head 46 (FIGS. 8-11) for subsequent engagement with the workpiece.

Figure 3:
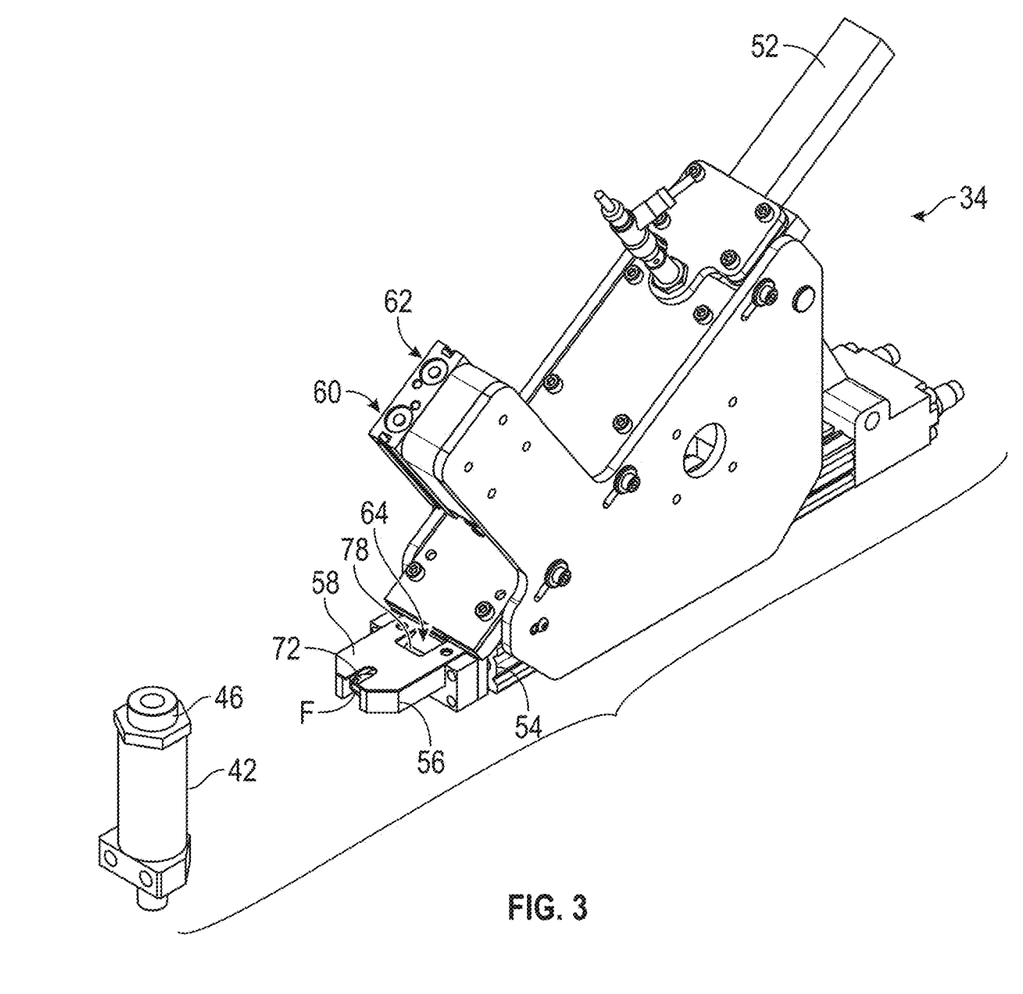
FIG. 3 is a perspective, enlarged cross-sectional views of a head assembly, electrode and fastener feeder.

Referring to FIG. 3, the feeder 34 includes an actuator 54 supporting a block 56. The block 56 receives from a chute 52 connected to the vibratory bowl 17 and locates the fastener F. One example actuator 54 is shown in the retracted position in FIGS. 3, 6 and 7A. In this example embodiment, a fixed link 70 locates the track 66 and the actuator 54 relate to one another and the frame 30.

Figure 6:
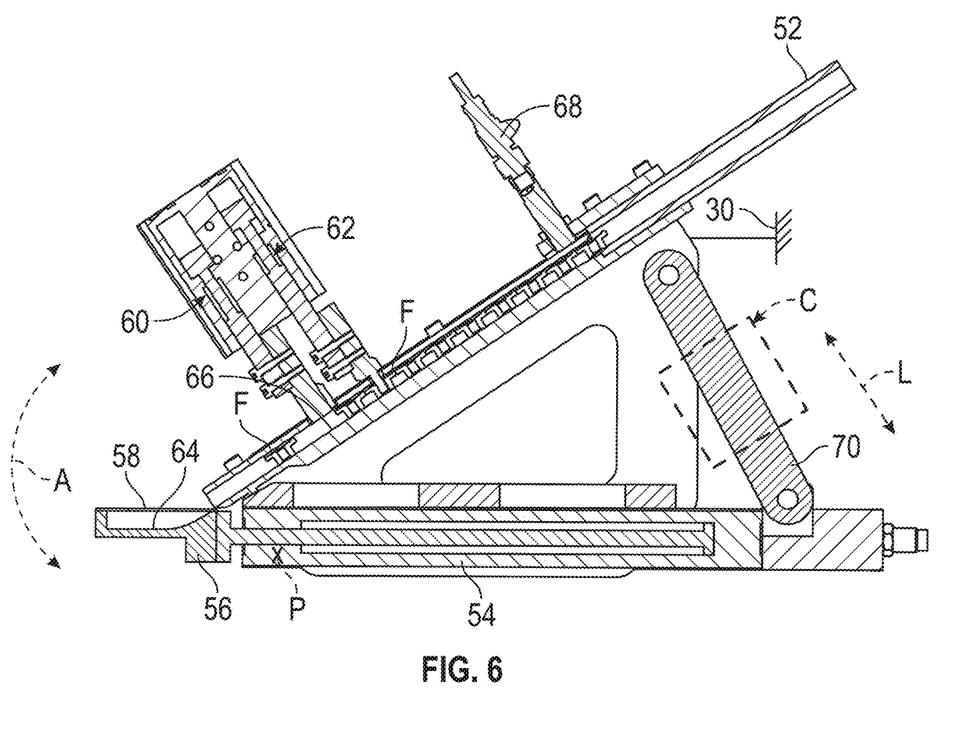
FIG. 6 is a cross-sectional view of an example fastener feeder releasing a nut.

Referring to FIGS. 3 and 6, a cue of fasteners F is provided to an inclined track 66 from the chute 52. The track 66 provides for storage of a quantity of oriented fasteners close to the point of use, so the transit time for the fastener to be dispensed from remote bulk feed source (e.g., bowl 17) does not impact the fastener feeding cadence. The angle of inclination ensures gravity contributes to urging the fasteners towards the block 56. A proximity sensor 68 can be used to ensure the track 66 is sufficiently full.

First and second escapements 60, 62 are operated in a coordinated manner using valves 160, 162 (FIG. 4) to selectively hold and release fasteners in sequence with the securing operation. As shown in FIG. 6, the second escapement 62 retains a second fastener in the cue, and the first escapement 60 is retracted to release the first fastener located between the first and second escapements 60, 62 within the track 66. The fastener F travels downward along the track 66 into a channel 64 provided in the block. Air may be used to blow the fastener F into the block 56 (e.g., using valve 117; FIG. 4) to supplement the effects of gravity.

A flexible retainer plate 58 is mounted relative to the block 56 and serves to prevent the fastener F from being dislodged from or flipping over in the block 56 prior to transfer to the locating pin 74, encouraging the fastener F to the fastener loading position within the block. The fastener F must pass through an aperture 78 in the retaining plate 58 (FIG. 3). The aperture 78 is sized to allow the intended fastener to pass freely, while rejecting oversized or misoriented fasteners. A proximity or other sensor 156 (FIG. 4) may be used to detect the presence of the fastener F. The retainer plate 58 is made of resilient material such as tempered aluminum bronze, spring steel, or polymer, selected to return to its original shape once the fastener F exits the block 56.

Figure 7A:
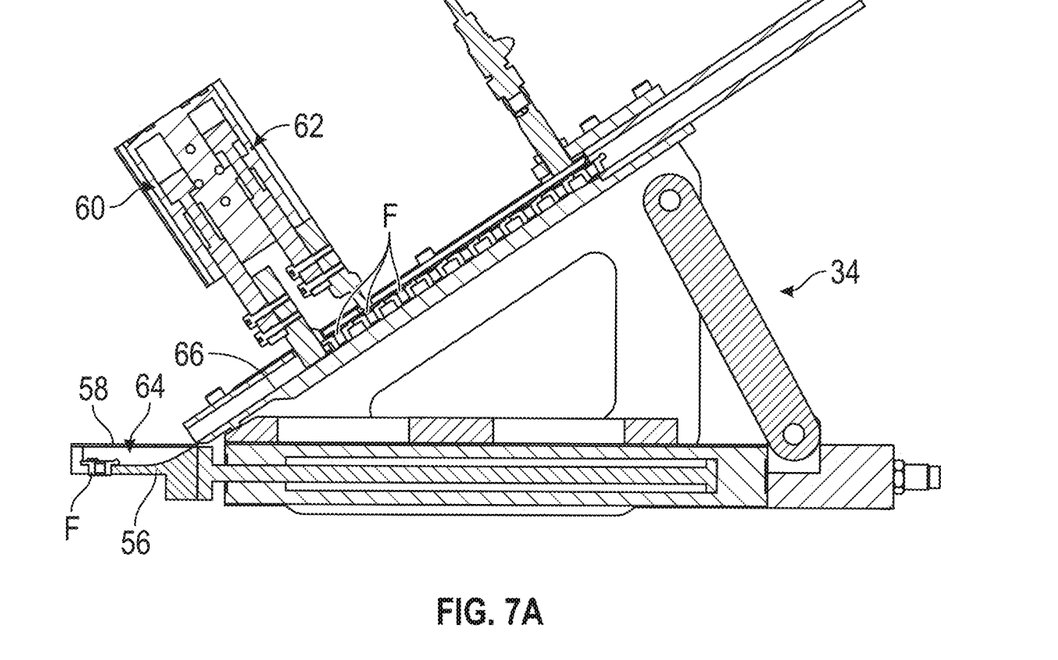
FIG. 7A is a cross-sectional view of the fastener feeder of FIG. 6 with the nut in a fastener loading position in a block.
Figure 7B:
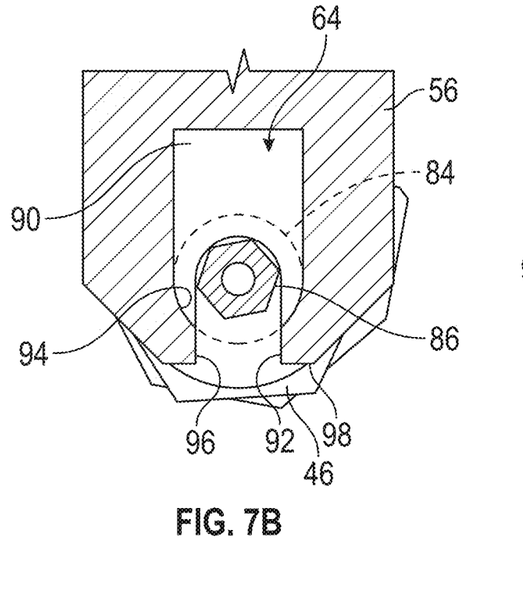
FIG. 7B is a cross-sectional view of the block shown in FIG. 7A.
Figure 7C:
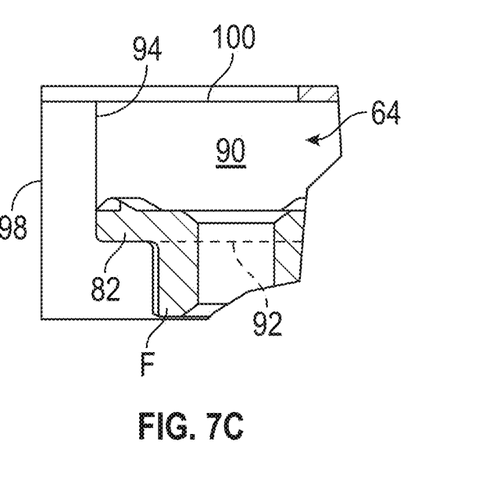
FIG. 7C is an enlarged cross-sectional view of the nut in the block as shown in FIG. 7A.

Referring to FIGS. 7A-7C, the fastener F is shown in the fastener loading position in which the fastener F is seated within the block 56 and ready for transfer to the electrode 42. The channel 64 includes a first slot 90 having a first width and extending to a stop 94. The channel 64 also includes a second slot 92 overlapping with the first slot 90 at the fastener loading position. The second slot 92 has a second width extending to an opening 96 in an end 98 of the block 56. In one example, the end 98 is opposite an end 102 (FIG. 9A) to which the retainer plate 58 is secured to provide a fulcrum for flexing.

The fastener F enters the channel 64 in an orientation with the second (smaller) diameter portion 84 down. The fastener F slides along the first slot 90 of the channel 64 until the first diameter portion 84 (flange 82) abuts the stop 94 at which point the fastener F can drop down such that the second diameter portion 86 is received in the second slot 92. In this fastener loading position, the fastener F is effectively captured between the first and second slots 90, 92 such that the fastener F cannot move laterally.

Figures 9A, 9B:
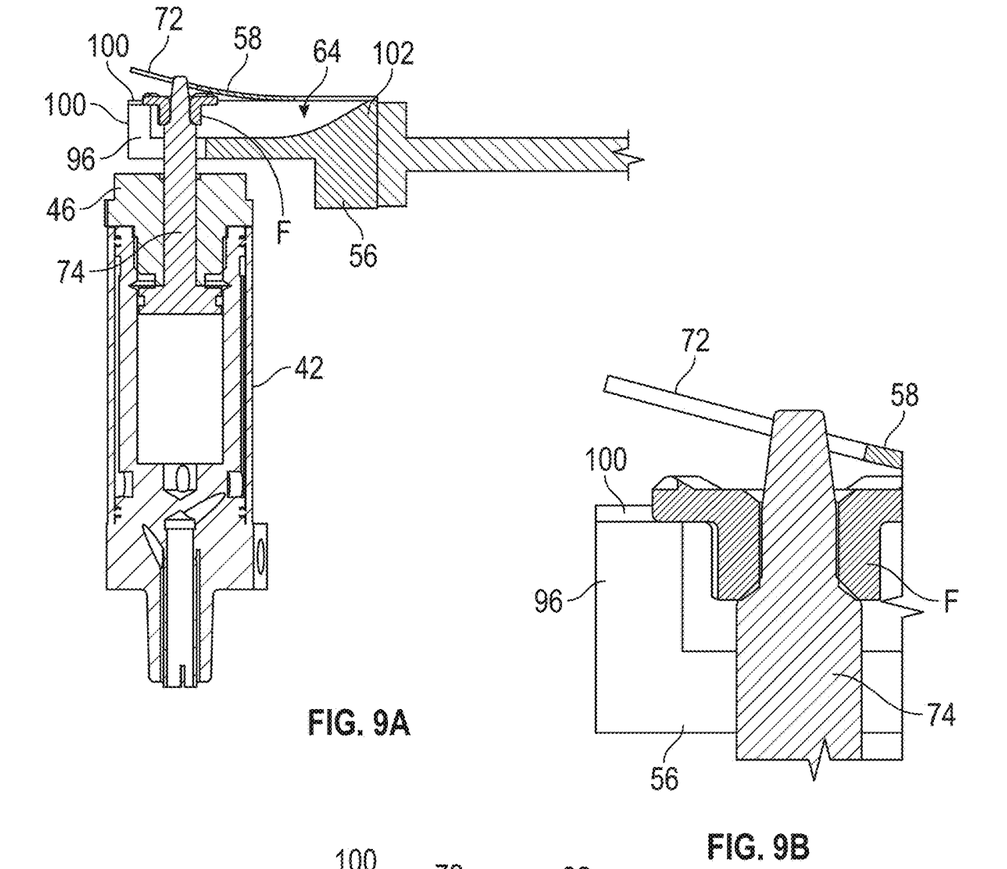
FIG. 9A is a cross-sectional view of a pin extended from the head into the block and the nut in a stripping position.
FIG. 9B is an enlarged cross-sectional view of the nut supported by the pin as shown in FIG. 9A.
Figure 9C:
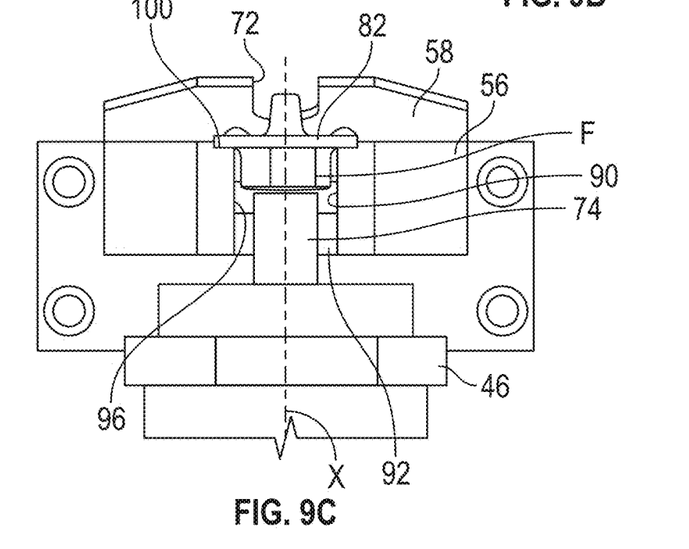
FIG. 9C is an end view of the pin supporting the nut in the stripping position as shown in FIGS. 9B and 9C.

With the fastener F positioned in the desired fastener loading position, the actuator 54 moves from the retracted position to an extended position illustrated in FIG. 8. The fastener F is arranged over the head 46 and beneath the pin 74, which is retracted within the head 46. From this position, the pin 74 may be moved from the retracted position to an extended position, which is shown in FIGS. 9A-11. With reference to FIGS. 9A-9C, the pin 74 moves upward along pin axis X until an end of the pin is received in the hole 80 of the fastener F, continuing to move the fastener F upward and into engagement with the retainer plate 58. As the pin 74 continues to move upward, the fastener F engages and then flexes the retainer plate 58 sufficiently away from the block 56 until the second diameter portion 84 has cleared the stop 94. In the example, this places the flange 82 above a recess 100 in the block 56, although the recess 100 may be omitted.

Figure 10:
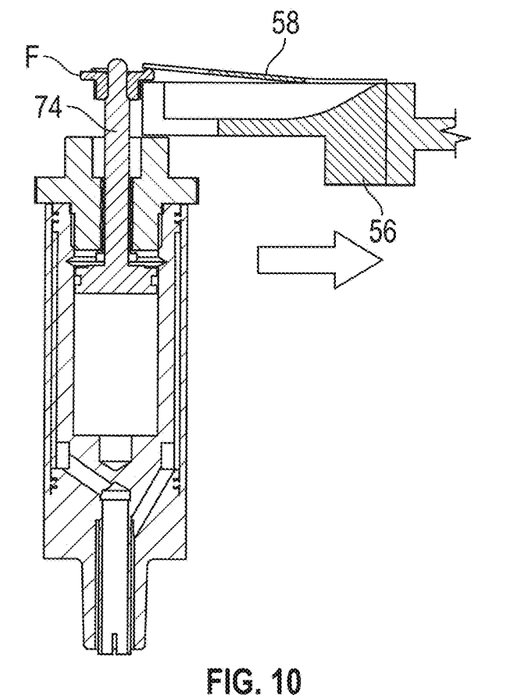
FIG. 10 is a cross-sectional view of the block partially retracted, stripping the nut from the block.
Figure 11:
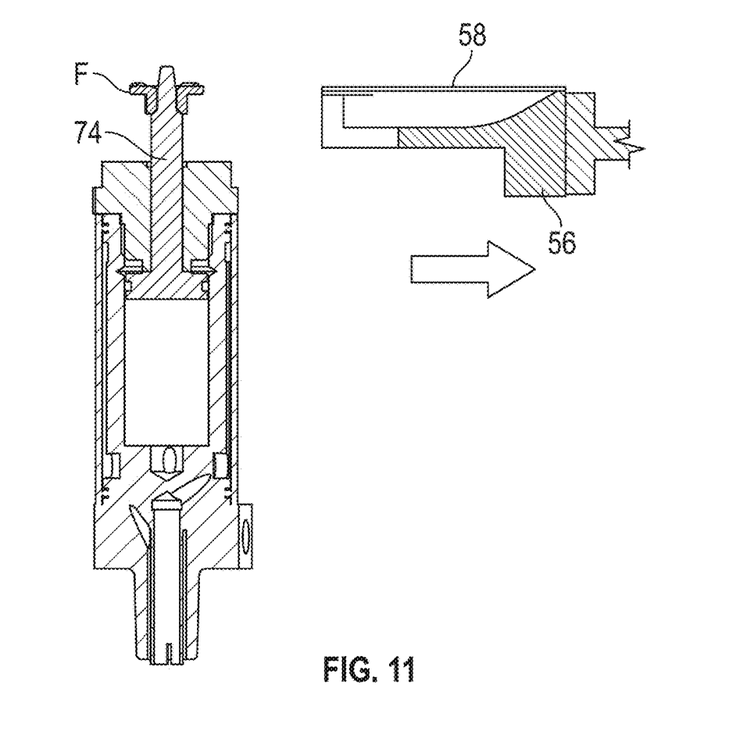
FIG. 11 is a cross-sectional view of the block further retracted relative to the position shown in FIG. 11.

Now that the fastener F has cleared the stop 94, the block 56 can be retracted by the actuator 54, stripping the fastener F from the block 56, as shown in FIGS. 10 and 11. The fastener F remains on the end of the pin 74 and the retainer plate 58 returns to its steady state position in which it covers the channel 64 in preparation for receiving the next fastener in the proper orientation. With the fastener F loaded onto the head 46, the robot 14 positions the workpiece between the fastener F and the weld gun 32 at a fastener joining location for the securing operation.

As an alternative to axially moving the pin 74 for stripping the fastener F, the actuator 54 and block 56 can be moved vertically in a direction A to lower and raise the block 56 onto and off of the pin 74. Such a system is described in PCT/CA2023/051312, entitled "SELF-PIERCING CLINCH FASTENER INSTALLATION PRESS", filed on Oct. 4, 2023, which is incorporated herein by reference in its entirety. In that type of feeder, a cylinder C is used in place of the fixed link 70 and extends and retracts along an axis L to move the actuator 54 about pivot P.

It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of feeding a fastener in a machine for installation onto a workpiece, the method comprising:
   a) feeding a fastener into a block having channel with a stop against which the fastener abuts in a fastener loading position, the channel at least partially covered by a flexible retainer plate that captures the fastener within the channel;
   b) moving the block relative to a pin to engage the fastener with the pin, the pin having a longitudinal pin axis;
   c) forcing the fastener into the retainer plate in a direction of the longitudinal pin axis to deflect the retainer plate away from the channel and disengage the fastener from the stop;
   d) retracting the block relative to the pin to support the fastener on the pin clear of the block; and
   e) securing the fastener to the workpiece.

2. The method of claim 1, wherein the channel includes a first slot having a first width and extending to the stop, and the channel includes a second slot overlapping the first slot at the fastener loading position, the second slot having a second width extending to an opening in the end of the block, the fastener having a first diameter portion and a second diameter portion smaller than the first diameter portion, wherein step a) is performed by sliding the fastener along the channel to the fastener loading position in which the first diameter portion is arranged in the first slot and the second diameter portion is arranged in the second slot in abutment with the stop.

3. The method of claim 2, wherein step a) includes blowing a fastener along a track with multiple fasteners and into the channel.

4. The method of claim 2, wherein the fastener is a first fastener arranged adjacent a second fastener in a track, and step a) includes retracting a first escapement to release the first fastener down the track to the channel while retaining the second fastener in the track with a retractable second escapement.

5. The method of claim 2, wherein step c) includes pushing the first diameter portion out of the first slot and past the stop.

6. The method of claim 5, wherein the retainer plate is supported relative to the block at one end, and the retainer plate includes a notch at another end opposite the one end, and step b) includes supporting the fastener with the pin, the pin extending through the notch, and step d) includes the pin exiting the block through the opening.

7. The method of claim 1, wherein step d) is performed by moving the block relative to the pin in a direction perpendicular to the longitudinal pin axis to strip the fastener from the block.

8. The method of claim 1, wherein step b) is performed by advancing the pin from a head and into the channel.

9. The method of claim 1, wherein step b) is performed by pivoting the block toward a head supporting the pin.

10. The method of claim 1, comprising a step of advancing the block toward the pin prior to performing step b).

11. The method of claim 1, wherein step e) includes supporting the fastener on a head, and performing one of a welding operation and a clinching operation on the fastener and the workpiece.

12. A machine for securing a fastener to a workpiece, comprising:
   a fastener feeder having a block with a channel providing a stop, the channel configured such the fastener abuts the stop in a fastener loading position, a flexible retainer plate at least partially covering the channel and configured to capture the fastener within the channel;
   a fastener joiner with a head having a pin with a pin axis configured to engage the fastener;
   wherein the fastener feeder and pin are configured to cooperate to forcing the fastener into the retainer plate in a direction of the longitudinal pin axis to deflect the retainer plate away from the channel and disengage the fastener from the stop, wherein retracting the block relative to the pin supports the fastener on the pin clear of the block.

13. The machine of claim 12, wherein the channel includes a first slot having a first width and extending to the stop, and the channel includes a second slot overlapping the first slot at the fastener loading position, the second slot having a second width extending to an opening in the end of the block, the fastener having a first diameter portion and a second diameter portion smaller than the first diameter portion, wherein step a) is performed by sliding the fastener along the channel to the fastener loading position in which the first diameter portion is arranged in the first slot and the second diameter portion is arranged in the second slot in abutment with the stop.

14. An assembly cell including the machine of claim 12, the assembly cell comprising a multi-axis robot configured to transfer the workpiece to and from the machine for a fastener securing operation.

15. The assembly cell of claim 14, comprising a conveyor configured to feed the workpiece to the multi-axis robot.

* * * * *